United States Patent Office 2,986,530
Patented May 30, 1961

2,986,530
ELECTROLUMINESCENT VITREOUS ENAMEL

Lewis C. Hoffman, Scotch Plains, N.J., assignor to E. I. du Pont de Nemours and Company, Wilmington, Del., a corporation of Delaware No Drawing. Filed July 16, 1959, Ser. No. 827,460

4 Claims. (Cl. 252—301.6)

This invention relates to electroluminescent vitreous enamels, methods for producing same and methods for the production of lamps therefrom.

Electroluminescent lamps have become quite well known in recent years. These lamps are produced by application of voltage across an activated electroluminescent type phosphor, for example, a zinc sulfide phosphor activated by firing with small amounts of copper, lead, halogen, manganese or the like. The activated phosphor, in the form of finely divided particles, is commonly dispersed in a transparent or translucent dielectric medium for example, a transparent plastic, wax, oil, resin or glass, and metal conductors, one of which must be transparent or translucent, positioned on opposite sides of the phosphor containing dielectric. The luminescing voltage is then impressed between said metal conductors.

The activated phosphors, particularly when used in vitreous dielectric material, will lose activation through firing of the vitreous material or because of chemical reaction with substances present in the dielectric.

It is an object of this invention to provide a new and improved method for the activation of a zinc sulfide phosphor.

It is another object of this invention to provide an unactivated zinc sulfide phosphor-vitreous enamel particulate mixture which may be fired to provide an activated zinc sulfide phosphor embedded in a vitreous enamel.

It is a further object of this invention to provide a new method for the production of electroluminescent lamps.

Others objects will appear hereinafter.

The above objects may be accomplished in general by admixing finely divided unactivated zinc sulfide particles with a vitreous enamel frit containing an activating amount of an activating agent for said zinc sulfide to convert said sulfide to an activated electroluminescent zinc sulfide phosphor.

The unactivated zinc sulfide should be substantially pure except that it may contain small amounts of ZnO or ZnSe. The vitreous enamel frit may be any frit composition that has the desired composition and coefficient of expansion to render it suitable for use on the desired metal substrate. It is greatly to be preferred that the enamel frit be one having a firing or maturing temperature of not to exceed 700° C.; however, it may, for example, be a steel enamel, an aluminum enamel, a copper enamel or an iron enamel, depending upon which metal is to be used as the conductor in the lamp structure. The enamel should be substantially free from oxides that deleteriously react with the zinc sulfide, for example, PbO or NiO. If lead oxide is present in an amount substantially exceeding about 1% by weight, the luminescence of a lamp is adversely affected. The lead oxide will react with zinc sulfide to form lead sulfide and nickel, constituting an electron trapping element, may diffuse into the phosphor to quench its luminescence. It is greatly preferred that the vitreous frit contain not to exceed 100 p.p.m. of Ni, Mn, Fe, Co or Pt which often act to quench electroluminescence.

The frit should be made with a 0.5% to 5% content of an activating oxide melted therein. The activating oxide may comprise one or more of SnO, CdO, $Cr_2O_3$, CuO or $As_2O_5$ of which SnO is by far superior to the other oxides. The activator oxide or oxides must be melted into the frit to function as an activator. The mere addition as a mill addition of the activator oxide will fail to activate the zinc sulfide even though the enamel frit and sulfide are later fired to maturing temperature.

Although I do not wish to be limited to any theory or scientific explanation as to how the above-described activation takes place, I believe that the activation is accomplished by diffusion of the activating cation into the lattice of the zinc sulfide during the firing operation when the enamel frit is melted.

The time and temperature of firing the mixture of phosphor and activator-containing frit appears to affect the electroluminescence of the resulting product. Too short or too long periods of firing will produce somewhat inferior results. At a given temperature with very short firing periods it can be speculated that there is insufficient diffusion of ions for activation. With long periods of firing electroluminescence also was absent. Since the concentration of the activating iron, for example, $Sn^{2+}$, is probably increasing steadily in the phosphor lattice, this can be explained as concentration quenching; that is, the presence of $Sn^{2+}$ ions as close neighbors prevents the mechanism for electroluminescence from operating.

The vitreous enamel frit is prepared in the conventional manner for preparing vitreous frits, that is, by mixing the frit ingredients, melting and fritting in water. The enamel frit must, however, contain as a completely melted in constituent, between 0.5% and 5% of activator oxide taken from the group consisting of SnO, CdO, $Cr_2O_3$, CuO or $As_2O_5$. This frit is then ball-milled to a size less than about 200 mesh and then mixed with finely divided zinc sulfide in the proportion of 50–90% by weight of zinc sulfide to 10–50% by weight of frit, preferably in the proportion of 65% to 80% sulfide to 20%–35% frit. If the phosphor-activator-frit is to be applied to aluminum, copper or austenitic stainless steel as the substrate then it may be desirable to add during the said ball-milling operation between 4% and 10% by weight of an anti-tearing agent as described and claimed in U.S. Patent No. 2,653,877.

The zinc sulfide, activator, mill addition and anti-tearing agents used in preparing the electroluminescent frits of this invention are preferably C.P. grade of materials.

The following examples of frit and activator ingredients are suitable for use in accordance with this invention. The amounts of ingredients are given in percentage by weight. The frits of these examples are prepared by heating batch ingredients, corresponding to the examples, in a fireclay crucible at about 1200° C. until all reactions are complete and solution of even the most refractory components has occurred. The molten glass is then fitted by running into water to cause rapid shattering. The frit is then air-dried at about 100° C.

TABLE I

*Frits for aluminum, copper or austenitic stainless steel, weight percent—all constituents completely melted in*

| Example No. | (1) | (2) | (3) | (4) | (5) | (6) | (7) |
|---|---|---|---|---|---|---|---|
| $SiO_2$ | 27.0 | 28.3 | 24.7 | 14.6 | 19.9 | 27.0 | 27.4 |
| $B_2O_3$ | 1.7 | | 6.5 | 9.7 | | 1.7 | 1.7 |
| $TiO_2$ | 25.3 | 30.9 | 26.2 | 31.9 | 22.3 | 25.3 | 24.3 |
| $Li_2O$ | 1.7 | 2.0 | 1.6 | 1.9 | 1.4 | 1.7 | 2.3 |
| $Na_2O$ | 22.4 | 25.4 | 20.9 | 21.5 | 18.7 | 22.4 | 22.4 |
| $K_2O$ | 9.2 | 10.6 | 9.7 | 7.3 | 7.4 | 9.2 | 9.2 |
| $BaO$ | 10.0 | | 9.4 | 12.1 | 29.3 | 6.0 | 8.5 |
| $Sb_2O_3$ | 1.7 | 1.8 | | | | 2.7 | 1.7 |
| $SnO$ | 1.0 | | | | | 4.0 | 2.5 |
| $CrO_3$ | | 1.0 | | | | | |
| $CdO$ | | | 1.0 | | | | |
| $CuO$ | | | | 1.0 | | | |
| $As_2O_3$ | | | | | 1.0 | | |

TABLE II

*Cover coat frits for steel, weight percent—all constituents completely melted in*

| Example No. | (8) | (9) | (10) | (11) | (12) | (13) | (14) |
|---|---|---|---|---|---|---|---|
| $SiO_2$ | 24.8 | 29.0 | 25.0 | 25.8 | 20.0 | 24.8 | 24.8 |
| $B_2O_3$ | 14.9 | 7.0 | 15.0 | 24.9 | 20.0 | 14.9 | 14.9 |
| $TiO_2$ | 23.8 | 24.0 | 18.0 | 15.9 | 15.0 | 23.8 | 23.8 |
| $Na_2O$ | 19.8 | 13.3 | 17.0 | 16.9 | 17.0 | 19.8 | 19.8 |
| $K_2O$ | 6.9 | 2.0 | 7.0 | 3.0 | 9.0 | 6.9 | 5.4 |
| $Li_2O$ | 4.0 | 5.0 | 4.0 | 5.0 | 4.0 | 4.0 | 4.0 |
| $BaO$ | | 15.0 | 10.0 | 5.8 | 8.0 | | |
| $Sb_2O_3$ | 3.0 | 2.0 | 3.0 | | | 1.5 | 1.5 |
| $ZnO$ | | | | | 3.0 | | |
| $F_2$ | 1.8 | 2.7 | | 1.8 | | 1.8 | 1.8 |
| $SnO$ | 1.0 | | | | | 2.5 | 4.0 |
| $CrO_2$ | | 1.0 | | | | | |
| $CdO$ | | | 1.0 | | | | |
| $CuO$ | | | | 1.0 | | | |
| $As_2O_3$ | | | | | 1.0 | | |

TABLE III

*Frits for other uses—all constituents completely melted in*

| Example No. | (15) | (16) | (17) | (18) | (19) |
|---|---|---|---|---|---|
| $Li_2O$ | 8.2 | 5.0 | | | |
| $Na_2O$ | | 6.2 | 18.3 | 18.5 | 8.7 |
| $K_2O$ | | | 9.2 | 9.2 | |
| $MgO$ | 1.3 | 1.2 | | | |
| $CaO$ | 1.8 | 0.7 | | | 3.9 |
| $SrO$ | 4.7 | 4.3 | | | |
| $BaO$ | 6.8 | 7.3 | | | |
| $Al_2O_3$ | 21.6 | 20.2 | 23.0 | 21.7 | 5.8 |
| $B_2O_3$ | 39.2 | 35.1 | 3.4 | | 26.7 |
| $SiO_2$ | 15.4 | 14.4 | | | 21.7 |
| $TiO_2$ | | | 2.4 | 2.4 | |
| $ZnO$ | | | | | 27.1 |
| $ZrO_2$ | | | | | 4.0 |
| $P_2O_5$ | | 4.6 | 41.7 | 46.7 | |
| $SnO, CrO_3, CdO, CuO$ or $As_2O_3$ | 1.0 | 1.0 | 2.0 | 1.5 | 2.1 |

EXAMPLE 20

Aluminum alloy sheet composed of alloy 6061 (0.25% Cu, 0.6% Si, 1.0% Mg and 2.5% Cr) is cleaned in hot chromic acid solution, rinsed and then treated for 7 minutes at 40° C. in a bath consisting of:

| | Gms. |
|---|---|
| NaOH | 330 |
| $K_2Cr_2O_7$ | 667 |
| $Cr_2(SO_4)_3$ | 14.2 |
| Water to 1 gallon. | |

After treatment, the sheet is rinsed and then heat-treated at 540° C. for 7 minutes. It is then ready for enameling.

One hundred parts frit of Example I, Table I is ball-milled with 7 parts by weight of an anti-tearing agent consisting of C.P. KOH—5%, boric acid—40% and anhydrous $Na_2SiO_3$—55% dissolved in deionized water, and 100 parts of deionized water until less than 0.1% is retained on a 325 mesh sieve. The resulting slip is used as a ground coat for an electroluminescent lamp to be formed on the aluminum alloy sheet.

A thin, 0.001 inch (after firing) coating (circa 10 grams of wet weight per square foot) is sprayed onto the aluminum alloy sheet and allowed to air dry. It is fired at about 540° C. for 7 minutes and allowed to cool. Seventy-five parts of electroluminescent grade ZnS (R.C.A. No. 33Z–19 unactivated zinc sulfide produced by Radio Corporation of America) is stirred into a suitable amount of the aforesaid frit-water slurry in the proportion of 75 parts ZnS-25 parts frit (by weight on a dry basis). Additional water may be added as required to maintain the desired consistency. The phosphor-enamel layer is sprayed or brushed on so as to obtain 0.003 inch fired thickness (about 30 grams wet weight per square foot). Different samples of lamps are fired at different temperatures and times as shown below whereby to mature the enamel and activate the phosphor simultaneously. Finally, a last, thin 0.001 inch clear frit layer is sprayed and fired to cover the phosphor-containing enamel layer and while the last layer is cooling it is sprayed with a solution of 40% $SnCl_4$, 40% ethyl alcohol, 10% of a 37% aqueous formaldehyde solution and 10% deionized water (percentages by weight) whereby to form thereon a transparent, iridescent electrode film having a resistance of about 300 ohms/square.

The several samples of lamps constructed in this manner are then incorporated in a capacitative circuit by mechanical contact to the back and front electrodes. The necessary circuit was produced by feeding the output of a Hewlett Packard Model 200CD oscillator into a McIntosh 30 watt amplifier, the output of which was fed into a 1:44 transformer which fed the lamp. The electroluminescence of the lamps fired at different temperatures and times were as follows:

| Temp. | Firing Time in Minutes | | | | | | |
|---|---|---|---|---|---|---|---|
| | 7 Min. | 15 Min. | 30 Min. | 60 Min. | 120 Min. | 240 Min. | 960 Min. |
| 400° | | | | | | | |
| 520° | | | | | | e.l. | e.l. |
| 540° | | | | | | e.l. | e.l. |
| 560° | | | | | e.l. | e.l. | e.l. |
| 580° | | | | | e.l. | | |
| 600° | | | | e.l. | e.l. | | |
| 620° | | | | e.l. | e.l. | | |
| 640° | e.l. | e.l. | e.l. | | | | |

The presence of electroluminescense was determined in an electric field of 100 volts/mil thickness of ground coat, enamel layer and coating layer, at a frequency of 9000 cycles per second (e.l.=electroluminescent).

EXAMPLE 21

A sheet of ⅛ inch type 302 stainless steel (18Cr–8Ni, balance Fe) was prepared for enameling by treatment at 80–90° C. in a 20% $H_2SO_4$ solution for 5 minutes followed by treatment in 3–4% HCl at 80–90° C. to remove the black smut formed in $H_2SO_4$. This treatment causes frit to adhere to stainless steel.

The same procedure as in Example 20 is then followed but using Frit Example No. 6, Table I. The resulting lamps showed electroluminecence at similar times and temperatures of firing.

EXAMPLE 22

Samples of enameler's iron, cast iron and ordinary sheet steel are enamelled with a low temperature maturing steel enamel frit having the following composition: $SiO_2$—24.8%, $B_2O_3$—23.8%, $TiO_2$—12.9%, $Na_2O$—16.9%, $K_2O$—3%, $Li_2O$—5%, $BaO$—6.3%, $Sb_2O_3$—3%, $CoO$—1.5%, $NiO$—0.5%, $MnO_2$—0.5%, and $F_2$—1.8%.

The procedure of Example 20 is then followed to overcoat the steel enamel with a phosphor-activator-enamel but using enamel No. 8, Table II. The latter enamel was fired for a period of 75 minutes at 600° C. after which the tin oxide conductor layer was formed over the phosphor enamel layer in the manner of Example 20. The resulting lamp, when incorporated in a capacitative circuit as in the above examples, exhibited a distinct electroluminescence.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

I claim:

1. A non-activated zinc sulfide-vitreous enamel frit composition capable of activation to produce an electroluminescent glass comprising a mixture of finely divided non-activated zinc sulfide of the electroluminescent type and finely divided vitreous enamel frit having a maturing temperature of not to exceed 700° C. and containing as essential ingredients in percentages by weight; $SiO_2$, 14.4 to 29%; $TiO_2$, 2.4 to 31.9%; $Li_2O$, 1.4 to 8.2%; and $Na_2O$, 6.2 to 25.4%; said mixture being free from metal oxides that deleteriously react with said zinc sulfide and containing an activating amount of a zinc sulfide activating agent taken from the group consisting of SnO, CdO, $Cr_2O_3$, CuO and $As_2O_5$.

2. A non-activated zinc sulfide-vitreous enamel frit composition capable of activation to produce an electroluminescent glass comprising a mixture of finely divided non-activated zinc sulfide and finely divided vitreous enamel frit having a maturing temperature of not to exceed 700° C. and containing as essential ingredients in percentages by weight; $SiO_2$, 14.4 to 29%; $TiO_2$, 2.4 to 31.9%; $Li_2O$, 1.4 to 8.2%; and $Na_2O$, 6.2 to 25.4%; said mixture containing less than 100 p.p.m. of Ni, Mn, Fe, Co or Pt and less than 1% by weight of PbO, and containing an activating amount of a zinc sulfide activating agent taken from the group consisting of SnO, CdO, $Cr_2O_3$, CuO and $As_2O_5$.

3. A non-activated zinc sulfide-vitreous enamel frit composition capable of activation to produce an electroluminescent glass comprising a mixture of 50–90% by weight of finely divided non-activated zinc sulfide of the electroluminescent type and 10–50% by weight of finely divided vitreous enamel frit having a maturing temperature of less than 700° C., and containing as essential ingredients in percentages by weight; $SiO_2$, 14.4 to 29%; $TiO_2$, 2.4 to 31.9%; $Li_2O$, 1.4 to 8.2%; and $Na_2O$, 6.2 to 25.4%; said frit containing less than 100 p.p.m. of Ni, Mn, Fe, Co or Pt and less than 1% by weight of PbO, and containing an activating amount of a zinc sulfide activating agent taken from the group consisting of SnO, CdO, $Cr_2O_3$, CuO and $As_2O_5$.

4. The method of producing an electroluminescent glass which comprises mixing between 50% and 90% by weight of finely divided non-activated zinc sulfide capable of activation to produce an electroluminescent glass with 10% to 50% by weight of finely divided vitreous enamel frit having a maturing temperature not to exceed 700° C., and containing as essential ingredients in percentages by weight; $SiO_2$, 14.4 to 29%; $TiO_2$, 2.4 to 31.9%; $Li_2O$, 1.4 to 8.2%; and $Na_2O$, 6.2 to 25.4%; said frit containing less than 100 p.p.m. of Ni, Mn, Fe, Co or Pt and less than 1% by weight of PbO, and containing 0.5% to 5% by weight of a zinc sulfide activating agent taken from the group consisting of SnO, CdO, $Cr_2O_3$, CuO and $As_2O_5$, and firing said mixture at the maturing temperature of the frit until said zinc sulfide is activated to electroluminescence.

References Cited in the file of this patent

UNITED STATES PATENTS

| 2,049,765 | Fischer | Aug. 4, 1936 |
| 2,224,516 | Kerstan | Dec. 10, 1940 |